United States Patent [19]

White et al.

[11] Patent Number: 5,458,258
[45] Date of Patent: Oct. 17, 1995

[54] STORAGE TANKS FOR COMPRESSED NATURAL GAS WITH A HYDROXY-PHENOXYETHER POLYMER BARRIER LINER

[75] Inventors: Jerry E. White, Midland, Mich.; Edgar S. Sanders, Jr., Pittsburg, Calif.; David J. Brennan, Midland, Mich.; Prakash U. Bakhru, Lake Jackson, Tex.; Susie K. Landes; Jo N. Anand, both of Midland, Mich.

[73] Assignee: The Dow Chemical Company, Midland, Mich.

[21] Appl. No.: 116,023

[22] Filed: Sep. 2, 1993

[51] Int. Cl.$^6$ .......................................... B32B 1/02
[52] U.S. Cl. ........................ 220/589; 220/414; 220/457; 220/586; 220/590; 428/332; 428/413; 428/416; 428/418; 428/474.4
[58] Field of Search ..................... 428/332, 413, 428/416, 418, 474.4; 62/45.1, 53.2; 220/586, 589, 590, 457, 414, 454, 469, 444

[56] References Cited

U.S. PATENT DOCUMENTS

| 3,305,528 | 2/1967 | Wynstra et al. | 260/47 |
| 3,944,106 | 3/1976 | Lamb | 220/5 A |
| 4,120,418 | 10/1978 | Collins et al. | 220/444 |
| 4,647,648 | 3/1987 | Silvis et al. | 528/102 |
| 5,089,588 | 2/1992 | White et al. | 528/99 |
| 5,115,075 | 5/1992 | Brennan et al. | 528/99 |
| 5,134,218 | 7/1992 | Brennan et al. | 528/98 |
| 5,143,998 | 9/1992 | Brennan et al. | 528/99 |
| 5,149,768 | 9/1992 | White et al. | 528/89 |
| 5,164,472 | 11/1992 | White et al. | 528/97 |
| 5,171,820 | 12/1992 | Mang et al. | 528/87 |
| 5,218,075 | 6/1993 | Brennan et al. | 528/29 |

OTHER PUBLICATIONS

Plastics News, Apr. 22, 1991, Brunswick Makes Composite Fuel Tanks.

*Primary Examiner*—Paul J. Thibodeau
*Assistant Examiner*—David Abraham

[57] ABSTRACT

A storage tank for compressed natural gas (CNG) comprises a hydroxy-phenoxyether polymermethane barrier liner and a fiber composite outer shell. The hydroxy-phenoxyether polymer has a methane transmission rate of not more than about 50 cc-mil/100 in$^2$-day (19.5 cm$^3$-mm/m$^2$-atm-day) at 25° C. and 2000 psi (13,800 kPa) methane pressure.

12 Claims, No Drawings

STORAGE TANKS FOR COMPRESSED NATURAL GAS WITH A HYDROXY-PHENOXYETHER POLYMER BARRIER LINER

BACKGROUND OF THE INVENTION

This invention relates to storage tanks and more particularly to storage tanks for compressed natural gas (CNG).

Natural gas, commonly known as methane gas, is a mixture of low molecular weight hydrocarbons obtained in petroleum-bearing regions throughout the world. It is generally composed of about 85 weight percent methane, 10 weight percent ethane, and the balance being made up of propane, butane and nitrogen. As part of its overall national energy policy, the Department of Energy (DOE) is considering CNG as an alternative fuel. CNG is being considered to be used as fuel for fleet cars, light duty vehicles, taxis and school buses. Some groups in the railroad industry are experimenting with natural gas to power their locomotives.

CNG storage tanks comprise pressure vessels which can withstand a service pressure of up to 5,000 psi (34,500 kPa). A pressure vessel typically comprises an outer structural shell provided with an inner liner. The outer shell provides strength for pressurization of the vessel while the liner prevents the gas from leaking out. Currently used inner liners are made of aluminum or steel. However, aluminum and steel liners add weight to the tank and are subject to corrosion and embrittlement upon exposure to water and hydrogen sulfide contaminants in the methane gas. Therefore it would be desirable to provide storage tanks with liners which are comparatively light and more resistant to methane contaminants and still provide good barrier to compressed natural gas.

SUMMARY OF THE INVENTION

In a first aspect, this invention is a storage tank for compressed natural gas, the storage tank comprising a hydroxy-phenoxyether polymer methane barrier liner.

In a second aspect, this invention is a process for making a storage tank for compressed natural gas which comprises providing a hydroxy-phenoxyether polymer methane barrier liner and forming a fiber composite outer shell around the barrier liner.

In a third aspect, this invention is a process for making a storage tank for compressed natural gas which comprises providing a pre-formed fiber composite outer shell and introducing a hydroxy-phenoxyether polymer barrier liner into the shell.

DETAILED DESCRIPTION OF THE INVENTION

Preferably, the hydroxy-phenoxyether polymers employed in the present invention are:
(1) hydroxy-functional polyethers having repeating units represented by the formula:

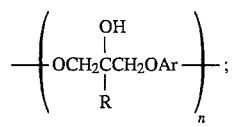

(2) amide- and hydroxymethyl-functionalized polyethers having repeating units represented by the formula:

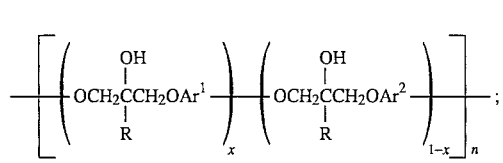

(3) hydroxy-functional poly(ether sulfonamides) having repeating units represented by the formula:

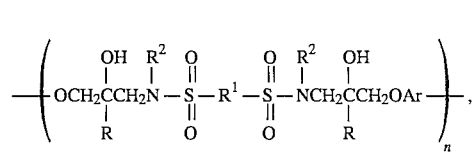

or

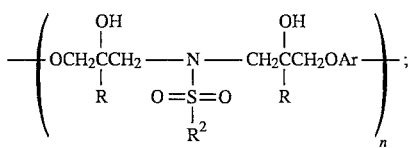

(4) poly(hydroxy amide ethers) having repeating units represented independently by any one of the formulae:

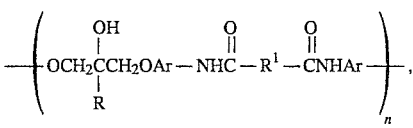

or

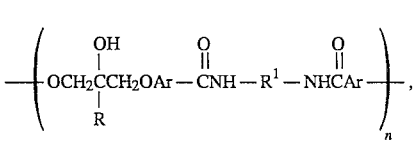

(5) poly(hydroxy ester ethers) having repeating units represented by the formula:

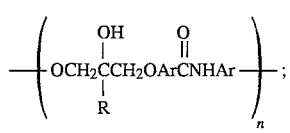

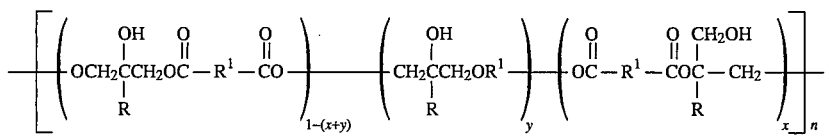

(6) poly(hydroxy amide ethers) having repeating units represented by any one of the formulae:

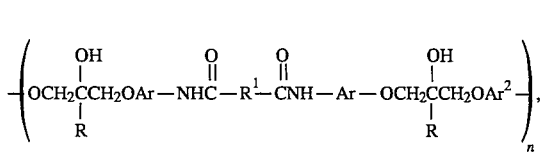

VIa

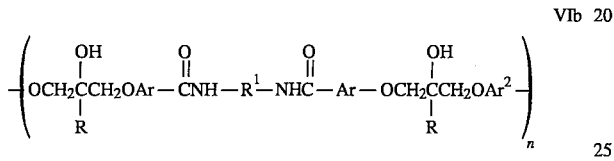

VIb or

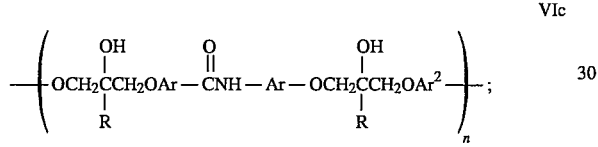

VIc (7) polyetheramines having repeating units represented by the formula:

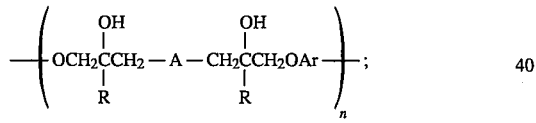

VII and (8) hydroxy-phenoxyether polymers having repeating units represented by the formula:

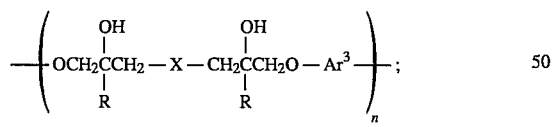

VIII wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each $Ar^1$ is a divalent aromatic moiety or combination of divalent aromatic moieties bearing amide or hydroxymethyl groups; each $Ar^2$ is the same or different than Ar and is individually a divalent aromatic moiety, substituted aromatic moiety or heteroaromatic moiety or a combination of different divalent aromatic moieties, substituted aromatic moieties or heteroaromatic moieties; $R^1$ is individually a predominantly hydrocarbylene moiety, such as a divalent aromatic moiety, substituted divalent aromatic moiety, divalent heteroaromatic moiety, divalent alkylene moiety, divalent substituted alkylene moiety or divalent heteroalkylene moiety or a combination of such moieties; $R^2$ is individually a monovalent hydrocarbyl moiety; A is a divalent amine moiety or a combination of different divalent amine moieties; X is a divalent amine, an arylenedioxy, an arylenedisulfonamido or an arylenedicarboxy moiety or combination of such moieties; and $Ar^3$ is a "cardo" moiety represented by any one of the formulae:

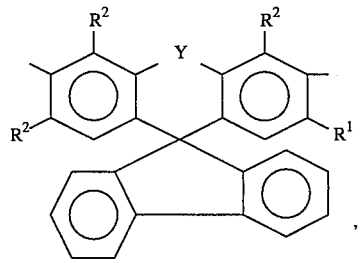

or

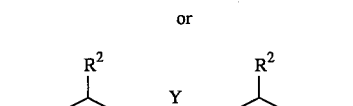
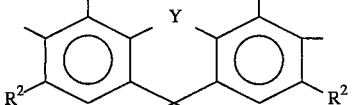
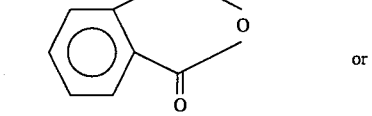

or

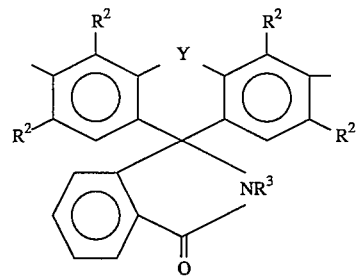

wherein Y is nil, a covalent bond, or a linking group, wherein suitable linking groups include, for example, an oxygen atom, a sulfur atom, a carbonyl atom, a sulfonyl group, or a methylene group or similar linkage; n is an integer from about 10 to about 1000; x is 0.01 to 1.0; and y is 0 to 0.5.

The term "predominantly hydrocarbylene" means a divalent radical that is predominantly hydrocarbon, but which optionally contains a minor amount of heteroatomic moiety such as oxygen, sulfur, imino, sulfonyl, sulfoxyl, and the like.

The hydroxy-functional polyethers represented by Formula I can be prepared, for example, by allowing a diglycidyl ether or combination of diglycidyl ethers to react with a dihydric phenol or a combination of dihydric phenols using the process described in U.S. Pat. No. 5,164,472, incorporated herein by reference in its entirety. Alternatively, the hydroxy-functional polyethers are obtained by allowing a dihydric phenol or combination of dihydric phenols to react with an epihalohydrin by the process described by Reinking, Barnabeo and Hale in the Journal of Applied Polymer Science, Volume 7, page 2135 (1963).

The amide- and hydroxymethyl-functionalized polyethers represented by Formula II can be prepared, for example, by reacting the diglycidyl ethers, such as the diglycidyl ether of bisphenol A, with a dihydric phenol having pendant amido, N-substituted amido and/or hydroxyalkyl moieties, such as 2,2-bis(4-hydroxyphenyl)acetamide and 3,5-dihydroxybenzamide. These polyethers and their preparation are described in U.S. Pat. Nos. 5,115,075 and 5,218,075, incorporated herein by reference in its entirety.

The hydroxy-functional poly(ether sulfonamides) represented by Formula III are prepared, for example, by polymerizing an N,N'-dialkyl or N,N'-diaryldisulfonamide with a diglycidyl ether as described in U.S. Pat. No. 5,149,768, incorporated herein by reference in its entirety.

The poly(hydroxy amide ethers) represented by Formula IV are prepared by contacting a bis(hydroxyphenylamido)alkane or arene, or a combination of 2 or more of these compounds, such as N,N'-bis(3-hydroxyphenyl) adipamide or N,N'-bis(3-hydroxyphenyl)glutaramide, with an epihalohydrin as described in U.S. Pat. No. 5,134,218, incorporated herein by reference in its entirety.

The poly(hydroxy ester ethers) represented by Formula V are prepared by reacting diglycidyl ethers of aliphatic or aromatic diacids, such as diglycidyl terephthalate, or diglycidyl ethers of dihydric phenols with, aliphatic or aromatic diacids such as adipic acid or isophthalic acid. These polyesters are described in U.S. Pat. No. 5,171,820, incorporated herein by reference in its entirety.

The poly(hydroxy amide ethers) represented by Formula VI are preferably prepared by contacting an N,N'-bis(hydroxyphenylamido)alkane or arene with a diglycidyl ether as described in U.S. Pat. Nos. 5,089,588 and 5,143,998, incorporated herein by reference in their entireties.

The polyetheramines represented by Formula VII are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These polyetheramines are described in U.S. application Ser. No. 864,975, filed Apr. 7, 1992, incorporated herein by reference in its entirety.

The hydroxy-phenoxyether polymers represented by Formula VIII are prepared, for example, by contacting at least one dinucleophilic monomer with at least one diglycidyl ether of a cardo bisphenol, such as 9,9-bis(4-hydroxyphenyl)fluorene, phenolphthalein, or phenolphthalimidine or a substituted cardo bisphenol, such as a substituted bis(hydroxyphenyl)fluorene, a substituted phenolphthalein or a substituted phenolphthalimidine under conditions sufficient to cause the nucleophilic moieties of the dinucleophilic monomer to react with epoxy moieties to form a polymer backbone containing pendant hydroxy moieties and ether, imino, amino, sulfonamido or ester linkages. These hydroxy-phenoxyether polymers are described in U.S. application Ser. No. 800,340, filed Nov. 26, 1991, incorporated herein by reference in its entirety.

The hydroxy-phenoxyether polymers commercially available from Phenoxy Associates, Inc. are suitable for use in the present invention. These hydroxy-phenoxyether polymers are the condensation reaction products of a dihydric polynuclear phenol, such as bisphenol A, and an epihalohydrin and have the repeating units represented by Formula I wherein Ar is an isopropylidene diphenylene moiety.

The hydroxy-phenoxyether polymers available from Phenoxy Associates, Inc. and the process for preparing them are described in U.S. Pat. No. 3,305,528, incorporated herein by reference in its entirety.

The hydroxy-phenoxyether polymers have methane transmission rates of not more than about 50 cc-mil/100 $in^2$-day (19.5 $cm^3$-mm/$m^2$-atm-day) at 25° C. and 2000 psi (13,800 kPa) methane pressure.

The CNG storage tank of the present invention comprises a fiber composite outer structural shell provided with a methane barrier inner liner made of a hydroxy-phenoxyether polymer.

Preferably, the CNG storage tank is constructed by providing a blow-molded hydroxy-phenoxyether polymer barrier inner liner and forming a fiber composite outer shell around the liner by filament winding.

Filament winding is a well known process for the fabrication of cylindrical and spherical fiber-reinforced parts or products such as pipes, chemical and fuel storage tanks and pressure vessels. Generally, the process comprises winding a series of continuous resin-impregnated fibers or filaments over a rotating mandrel. As used herein, a filament comprises strands of twisted and drawn-out fibers. The mandrel is a core around which the fibers or filaments are wound. It is made of metal, plaster, plastic, wood, cardboard or the like. The fibers or filaments are applied to the mandrel according to a predetermined relationship using conventional numerically computer-controlled or chain and gear mechanical winding machines. The resin-impregnated fibers or filaments are cured on the mandrel. The mandrel is subsequently extracted from the wound product or may remain as an integral element of the product. In the construction of the present CNG storage tank as described above, the blow-molded hydroxy-phenoxyether polymer barrier liner serves as the mandrel which is not extracted from the wound fiber composite but remains as an integral element thereof. A detailed description of filament winding is described in the *Encyclopedia of Polymer Science and Engineering,* Second Edition, Vol. 7, pages 39–52.

Blow molding is also a well known process. See, for example, the *Plastics Engineering Handbook* of the Society of the Plastics Industry, Inc., 4th Edition, pages 326–347. The blow molding process generally comprises the steps of melting the resin, forming the molten resin into a tube or parison, inserting the tube into a closed mold, sealing the ends of the tube, except for an area in which the blowing air can enter, injecting air into the tube to blow it out against the sides of the mold where it sets up into the finished product, cooling the blow molded part and ejecting the molded part from the mold.

Alternatively, the CNG storage tank can be constructed by introducing a hydroxy phenoxyether polymer barrier liner into a pre-formed filament-wound fiber composite outer shell by conventional processes such as solvent spraying or rotomolding/rotolining. A process for rotomolding/rotolining fabricated components with a melt-processible thermoplastic is described in U.S. Pat. No. 4,312,961, the pertinent portions of which are incorporated herein by reference.

A fiber composite typically comprises reinforcing fibers or filaments embedded in a resin matrix. The resin can be applied on the filaments using either the prepreg method or the wet winding method. In the prepreg method, the filament is impregnated with a liquid resin and partially cured and then usually stored at low temperature to retard the curing process until required for winding. In the wet winding method, the filaments are impregnated with liquid resin just before winding on the mandrel.

Suitable fibers for making the fiber composite include, but are not limited to, fiber glass, carbon fibers and aramid fibers, used singly or in combination. Suitable resins for impregnating the fibers or filaments include, but are not limited to, epoxy resins, polyester, vinyl ester resins and other curable prepolymers.

Suitable epoxy resins which can be employed herein include essentially any epoxy-containing compound which contains an average of more than one vicinal epoxide group per molecule. The epoxide groups can be attached to any oxygen, sulfur or nitrogen atom or the single bonded oxygen atom attached to the carbon atom of a —COO— group in which said oxygen, sulfur or nitrogen atom or the carbon atom of the —COO— group is attached to an aliphatic, aromatic or cycloaliphatic hydrocarbon group which hydrocarbon group can be substituted with any inert substituent including, for example, halogen atoms, preferably chlorine or bromine, nitro groups and the like. Examples of suitable epoxy resins include, but are not limited to, bisphenol A type epoxy resin, bisphenol F type epoxy resin, cycloaliphatic epoxy resin, novolac type epoxy resin and glycidyl ester type epoxy resin.

Thickness of the hydroxy phenoxyether polymer methane barrier liner can range from 1 mil to 1 inch (0.0254 to 25.4 mm). Preferred thickness of the liner is from 0.125 to 0.5 inch (3.175 to 12.7 mm).

The following working examples are given to illustrate the invention and should not be construed as limiting its scope. Unless otherwise indicated, all parts and percentages are by weight.

EXAMPLES 1–5

Five hydroxy-phenoxyether polymers are prepared and tested for their methane barrier properties. These polymers are as follows:

Polymer 1—Prepared by following the general procedure described in Example 1 of U.S. application Ser. No. 864,975, filed on Apr. 7, 1992, using the diglycidyl ether of bisphenol-A, the diglycidyl ether of hydroquinone and piperazine recrystallized from diethyl ether.

Polymer 2—Prepared by following the general procedure described in Example 1 of U.S. application Ser. No. 864,975, filed on Apr. 7, 1992, using the diglycidyl ether of bisphenol-A and aminoethanol.

Polymer 3—Prepared by following the general procedure described in U.S. Pat. No. 5,171,820.

Polymer 4—Prepared by following the general procedure described in U.S. Pat. No. 5,164,472.

Polymer 5—Prepared by following the general procedure described in U.S. Pat. No. 5,164,472.

Structures of Polymers 1–5 are as follows:

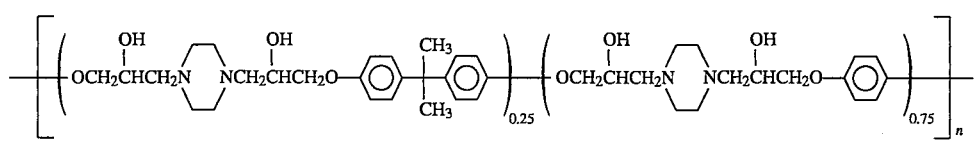

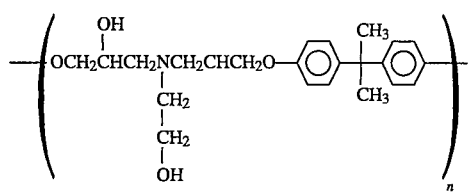

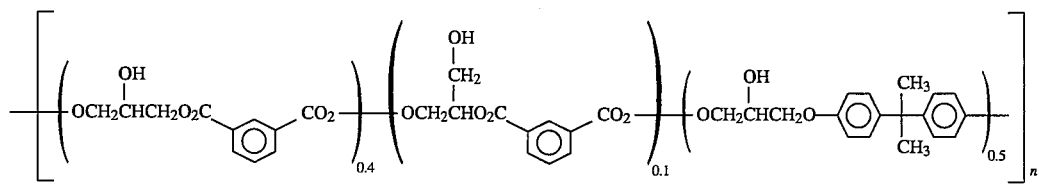

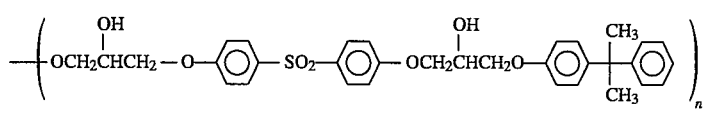

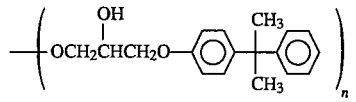

Specimens (3.8 cm diameter; approximately 0.3 mm thick) for methane barrier evaluation are prepared by compression molding samples (1.5 g) of Polymers 1–5 on a 40 ton double platen press at 200° C. to 260° C. at 500 psi (3,450 kPa) for 4 minutes, then at 30,000 psi (207 MPa) for 4 minutes and then cooled for 10 minutes. Methane barrier properties of the specimens are measured using a standard constant volume, variable pressure permeation apparatus. The apparatus has a 23.78 cm downstream volume and is equipped with a 0–10 cm Hg Baratron pressure transducer. Methane feed pressures ranging from 500 psi (3,450 kPa) to 2000 psi (13,800 kPa) are employed. To determine the effect of humidity on the sample, 0.5 microliters of water are introduced to the high pressure side of the permeation cell using a microliter syringe. Because the permeability of the cell is so low, the leak rate of the system is determined after loading the test specimen. The term "leak rate" as used herein, means the amount of methane gas that passes through the permeation cell in cc-mil/100 in$^2$-day (cm$^3$-mm/ m$^2$-atm-day) @ 25° C. Samples with a leak causing a pressure rise greater than 0.001 cm Hg/hr are not used. The leak rate of the acceptable samples is used as a base line correction for the measured permeability. Reported permeability values are the averaged results of at least 3 independent measurements. More typically, 10 to 15 measurements are used. The results are shown in Table I.

TABLE I

| Polymer | CH$_4$TR,[a] "dry" | CH$_4$TR,[b] "wet" | Pressure, psi |
|---|---|---|---|
| 1 | 0.37 (0.144) | nd | 2000 |
| 2 | 45.5 (17.7) | 0.12 | 2200 |
| 3 | 0.21 (0.08) | 0.10 | 1650 |
| 4 | 0.15 (0.06) | 0.17 | 1650 |
| 5 | 0.10 (0.04) | 0.30 | 1650 |

[a]Methane Transmission Rate after vacuum of less than 10 microns applied to both sides of membrane until leak test is passed, in cc-mil/100 in$^2$-day (cm$^3$-mm/m$^2$-atm-day) @ 25° C.
[b]Methane Transmission Rate after 0.5 microliter of water is added to the feed chamber of the permeation cell, in cc-mil/100 in$^2$-day @ 25° C.
nd - not determined The data in the above table show that the hydroxyphenoxyether polymers exhibit very low permeabilities to methane at high pressures even when the methane gas contains moisture. The data also show that under extremely dry conditions, Polymer 2 is not good barrier to methane, but is an excellent barrier when methane contains a small amount of moisture.

What is claimed is:

1. A storage tank for compressed natural gas, the storage tank having a methane barrier liner comprising a hydroxyphenoxyether polymer which has a methane transmission rate of not more than about 50 cc-mil/100 in$^2$-day at 25° C. and 2000 psi.

2. The storage tank of claim 1 wherein the hydroxyphenoxyether polymer is selected from the group consisting of:

(1) hydroxy-functional polyethers having repeating units represented by the formula:

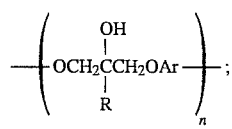

(2) amide- and hydroxymethyl-functionalized polyethers having repeating units represented by the formula:

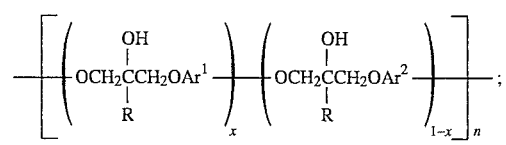

(3) hydroxy-functional poly(ether sulfonamides) having repeating units represented by the formula:

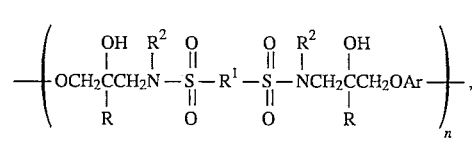

or

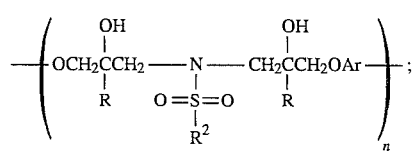

(4) poly(hydroxy amide ethers) having repeating units represented independently by any one of the formulae:

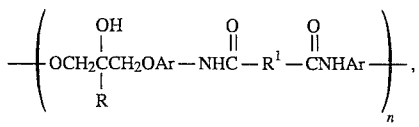

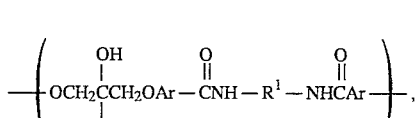

or

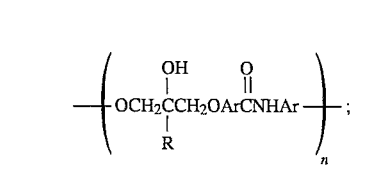

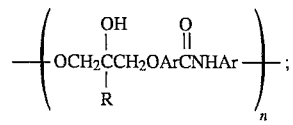

(5) poly(hydroxy ester ethers) having repeating units represented by the formula:

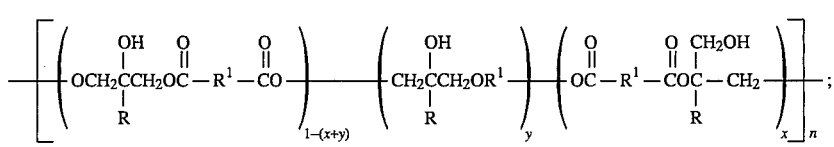

(6) poly(hydroxy amide ethers) having repeating units represented by any one of the formulae:

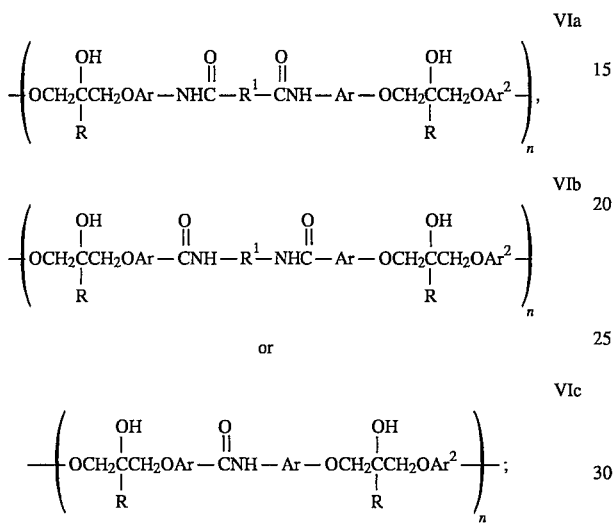

(7) polyetheramines having repeating units represented by the formula:

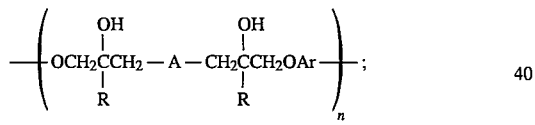

and (8) hydroxy-phenoxyether polymers having repeating units represented by the formula:

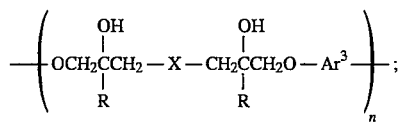

wherein each Ar individually represents a divalent aromatic moiety, substituted divalent aromatic moiety or heteroaromatic moiety, or a combination of different divalent aromatic moieties, substituted aromatic moieties or heteroaromatic moieties; R is individually hydrogen or a monovalent hydrocarbyl moiety; each $Ar^1$ is a divalent aromatic moiety or combination of divalent aromatic moieties bearing amide or hydroxymethyl groups; each $Ar^2$ is the same or different than Ar and is individually a divalent aromatic moiety, substituted aromatic moiety or heteroaromatic moiety or a combination of different divalent aromatic moieties, substituted aromatic moieties or heteroaromatic moieties; $R^1$ is individually a predominantly hydrocarbylene moiety; $R^2$ is individually a monovalent hydrocarbyl moiety; A is a divalent amine moiety or a combination of different divalent amine moieties; X is a divalent amine, an arylenedioxy, an arylenedisulfonamido or an arylenedicarboxy moiety or combination of such moieties; and $Ar^3$ is a "cardo" moiety represented by any one of the formulae:

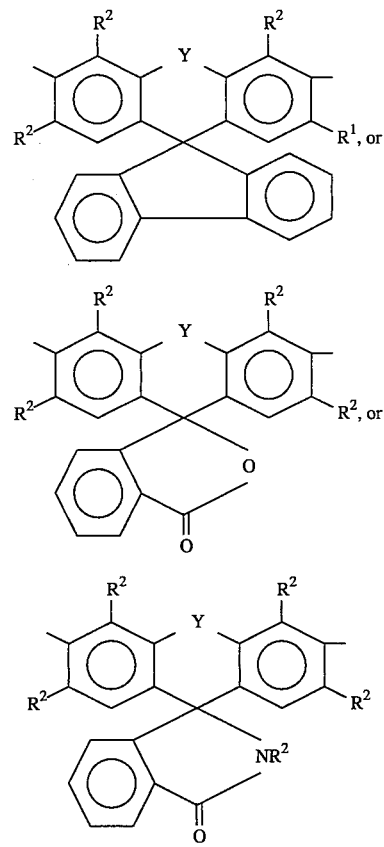

wherein Y is nil, a covalent bond, or a linking group which is an oxygen atom, a sulfur atom, a carbonyl atom, a sulfonyl group, or a methylene group; n is an integer from about 10 to about 1000; x is 0.01 to 1.0; y is 0 to 0.5; $R^1$ is individually a predominantly hydrocarbylene moiety; and $R^2$ is individually a monovalent hydrocarbyl moiety.

3. The storage tank of claim 2 wherein $R^1$ in the formulae representing the hydroxy-phenoxyether polymer is a divalent aromatic moiety, substituted divalent aromatic moiety, divalent heteroaromatic moiety, divalent alkylene moiety, divalent substituted alkylene moiety or divalent heteroalkylene moiety or a combination of such moieties.

4. The storage tank of claim 1 wherein the hydroxy-phenoxyether polymer is selected from the group consisting of polymers having repeating units represented by the following formulae:

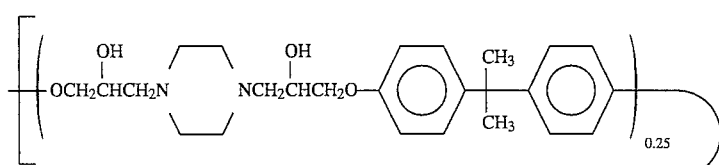

1

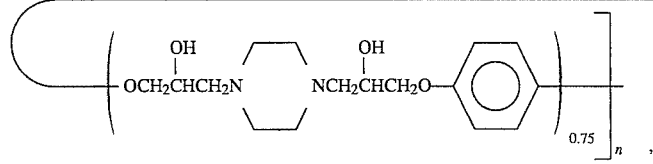

2

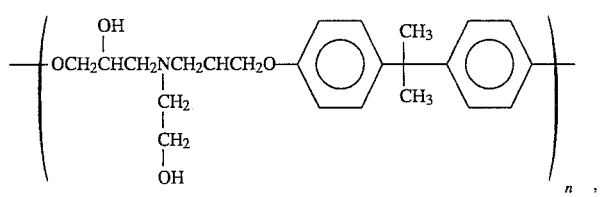

3

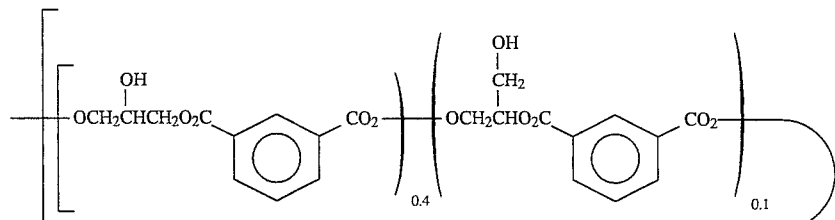

4 and

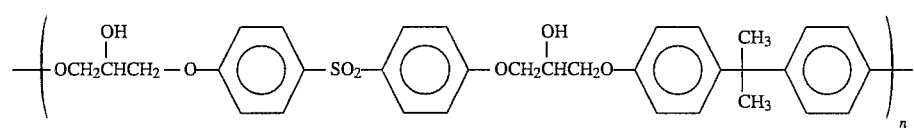

5

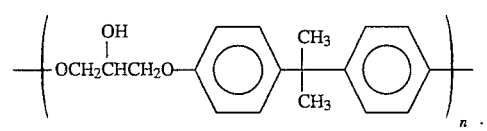

wherein n is from about 10 to about 1000 wherein n is from about 10 to about 1000.

5. The storage tank of claim 1 wherein the hydroxyphenoxyether polymer is a condensation reaction product of bisphenol A and an epihalohydrin.

6. The storage tank of claim 1 wherein the liner is disposed within a filament-wound fiber composite outer shell.

7. The storage tank of claim 6 wherein the filament-wound fiber composite outer shell comprises glass or carbon fibers embedded in an epoxy resin matrix.

8. The storage tank of claim 6 wherein the liner is blow-molded.

9. The storage tank of claim 6 wherein the liner is rotomolded.

10. The storage tank of claim 6 wherein the liner has a thickness of from about 1 mil to about 1 inch.

11. The storage tank of claim 6 wherein the liner has a thickness of from about 0.125 inch to about 0.5 inch.

12. The storage tank of claim 6 wherein the liner is solvent sprayed into the fiber composite outer shell.

* * * * *